(12) United States Patent
Berglund et al.

(10) Patent No.: US 8,658,287 B2
(45) Date of Patent: Feb. 25, 2014

(54) STRONG NANOPAPER

(75) Inventors: Lars Berglund, Åkersberga (SE);
Andong Liu, Stockholm (SE)

(73) Assignee: Tetra Laval Holdings & Finance SA, Pully (CH)

( * ) Notice: Subject to any disclaimer, the term of this patent is extended or adjusted under 35 U.S.C. 154(b) by 0 days.

(21) Appl. No.: 13/509,973

(22) PCT Filed: Nov. 16, 2010

(86) PCT No.: PCT/SE2010/051259
§ 371 (c)(1),
(2), (4) Date: May 15, 2012

(87) PCT Pub. No.: WO2011/059398
PCT Pub. Date: May 19, 2011

(65) Prior Publication Data
US 2012/0216718 A1    Aug. 30, 2012

Related U.S. Application Data (66) Substitute for application No. 61/267,559, filed on Dec. 8, 2009.

(60) Provisional application No. 61/261,461, filed on Nov. 16, 2009.

(51) Int. Cl.
*B32B 23/04*    (2006.01)

(52) U.S. Cl.
USPC ........ 428/532; 428/536; 428/537.5; 427/392; 977/902

(58) Field of Classification Search
USPC ......... 428/532, 536, 537.5; 427/392; 977/902
See application file for complete search history.

(56) References Cited

U.S. PATENT DOCUMENTS

| | | | |
|---|---|---|---|
| 4,952,278 A * | 8/1990 | Gregory et al. | 162/141 |
| 2003/0051837 A1 * | 3/2003 | Silenius | 162/141 |

FOREIGN PATENT DOCUMENTS

| | | | |
|---|---|---|---|
| EP | 1036799 | * | 9/2000 |
| EP | 1036799 A1 | | 9/2000 |
| EP | 1469126 A1 | | 10/2004 |
| JP | 7-003691 A | | 1/1995 |

OTHER PUBLICATIONS

Yilmaz, Biodegradable polymers, sustainpack SP3 Workshop, Valencia, Apr. 2007, Slides 32-33.*
Nordquist, "Starch nanocomposites" J. Biobased Mater. Bio 2009, 3(2), 139-146.*
Aucejo, SP3; "the use of nanoclays", Verona, Italy, Apr. 2007.*
Yilmaz, Biodegradable Polymers, Description, Properties and Advances, Sustainpack SP3 Workshop, Valencia, Apr. 2007, p. 1-42.
Nordqvist, et al, Starch Nanocomposites with Platelet and Fibrillar Fillers, Journal of Biobased Materials and Bioenergy, (2009), vol. 3, p. 139-146 (Abstract from Compendex).
Henriksson, et al, Cellulose Nanopaper Structures of High Toughness, Biomacromolecules, (2008) vol. 9, 1579-1585.
Hosokawa, et al, Reaction Between Chitosan and Cellulose on Biodegradable Composite Film Formation, Industrial Engineering and Chemistry Research (1991), vol. 30, p. 788-792.
Sehaqui, et al, Fast Preparation Procedure for Large, Flat Cellulose and Cellulose/Inorganic Nanopaper Structures, Biomacromolecules, (2010), vol. 11, p. 2195-2198.
Aucejo, SP3: The use of nanoclays and/or MFC in composite films, SP%—Sustainpack Seminar, Verona, Italy, Apr. 2007 (Abstract).
Mörseburg, et al, Assessing the Combined Benefits of Clay and Nanofibrillated Cellulose in Layered TMP-based Sheets, Cellulose (2009), vol. 16, No. 5, p. 795-806.

* cited by examiner

*Primary Examiner* — Leszek Kiliman
(74) *Attorney, Agent, or Firm* — Buchanan Ingersoll & Rooney PC (57) ABSTRACT

The present invention refers to a nanopaper comprising clay and microfibrillated cellulose nanofibers wherein the MFC nanofibers and the layered clay are orientated substantially parallel to the paper surface. The invention further relates to a method of making the nanopaper and the use of the nanopaper.

28 Claims, 9 Drawing Sheets

STRONG NANOPAPER

RELATED APPLICATIONS

The present application is a 371 of PCT/SE2010/051259 filed Nov. 16, 2010 and claims priority under 35 U.S.C. 119 to U.S. Application No. 61/261,461 filed Nov. 16, 2009 and U.S. Application No. 61/267,559 filed Dec. 8, 2009.

TECHNICAL FIELD

The present invention relates to a strong nanopaper, the use thereof and a method of preparing said nanopaper.

BACKGROUND

Adobe is a clay-rich mixture of straw and clay which has been used as building material for people to shelter from the wind and rain for thousands of years. For this kind of structural composites, clay provides a good barrier property for light, rain and heat, and fibrous straw provides strength and durability that prevents cracking, increases its insulativity and makes it lighter.

In nature there are many organisms with this kind of polymer-ceramic particle composite structure. Normally, they have excellent strength and toughness. For example, nacre, originating from the shell of abalone, with 1-5% protein and aragonite, has a tensile strength of 140-170 MPa, a Young's modulus of 60-70 GPa, and a three point bending of 350-1240 $J \cdot m^{-2}$ depending on its hydration state. As a result, many methods have been reported so far to simulate the nacre "brick and mortar" structure, including sequential deposition, supra-molecular self-assembly (dip-coating), crystallization on self-assembled layers, crystallization beneath Langmuir monolayers, layer-by-layer self-assembly, casting procedure and so on. The best results were achieved by Tang et al, who produced ultra strong composite layers with thickness of about 5 μm by alternately dipping a glass slide in polyelectrolyte and clay platelet suspension. However, such method requires really long assembly time because each cycle deposited about 24 nm. Recently, Tang et al. developed a new method called "exponential growth" LBL. The self-assembly time was shortened, but it still takes 1000 min to obtain a film with thickness of 200 μm. F. Mizukami et al used a casting procedure to prepare flexible transparent clay films with the thickness of 3-200 μm. The preparation was markedly simplified and also the films have good heat-resistant and high gas-barrier properties. However, the tensile strength of the material is only 25 MPa. The weak strength will be an obstruction for further application of this kind of clay films. The casting procedure is still a time-consuming method due to the slow evaporating of the water. It is difficult to reproduce the brick and mortar microstructure of nacre in a convenient way.

As known, in the case of nacre, only 1-5% of the proteins act as the binder additive. For artificial nacre, water-soluble polymers (WSPs) such as polyelectrolytes, polymer sodium salt or PVOH were used as the binder additive instead of the protein in the natural nacre. There is a strong electrostatic or hydrogen bonding interaction between WSPs and inorganic clay platelets. However, in contrast to the low content of protein found in the nacre, typically the content of WSPs used in the artificial nacre is more than 50 wt. %. Additionally, most of the WSPs used today are non-biodegradable, and also WSPs have bad water-resistance or solvent-resistance.

SUMMARY OF THE INVENTION

The present invention relates to a strong clay/MFC nanopaper, a method for preparing the same and the use thereof.

The nanopaper of the present invention has a unique and important structure where the MFC and the clay, which has a layered structure itself, are arranged substantially parallel to the surface of the paper. The clay particles, or platelets, are in the nanometer range and the length of the nanofibres of the MFC is in the micrometer range giving the nanopaper its unique properties. Further the clay particles, or platelets, are preferably substantially isolated from each other.

One aspect of the present refers to a nanopaper comprising clay and microfibrillated cellulose nanofibres wherein the MFC nanofibres and the layered clay are orientated substantially parallel to the paper surface.

In one embodiment of the present invention the clay comprises particles in the nanometer range.

In another embodiment the length of the microfibrillated cellulose nanofibres is in the range of 5-20 μm.

In another embodiment the amount of microfibrillated cellulose is more than 10 wt %, or more than 20 wt %, or more than 40 wt % but less than 50 wt %, or less than 35 wt % or less than 25 wt %.

In yet another embodiment the amount of clay is more than 10 wt %, or more than 40 wt %, or more than 60 wt % but not more than 90 wt %, or less than 80 wt %, or less than 50 wt % or less than 30 wt %.

In yet another embodiment the nanopaper further comprises a water soluble cross-linker.

In yet another embodiment the amount of cross-linker is more than 5 wt %, or more than 20 wt %, or more than 35 wt % but not more than 50 wt % or less than 40 wt % or less than 25 wt %; based on the total weight of the nanopaper.

In still another embodiment the tensile stress of the nanopaper is at least 30 MPa for samples of 40 mm in length, 60-80 μm thick and a 5 mm wide; using 100N load cell and at a frame rate of 5 fbs; and wherein the tests were conducted at a humidity of 50% and at 23° C.

In yet another embodiment the paper consists of microfibrillated cellulose and clay.

Another aspect of the present invention refers to a coating comprising the nanopaper according to the present invention.

Another aspect of the present invention refers to a method for preparing a clay-microfibrillated cellulose nanofibre nanopaper comprising:
  preparing a suspension of clay and microfibrillated cellulose nanofibres
  mixing said suspension
  filtrating said suspension
  obtaining or forming a film of said filtrated suspension
  drying of said film.

In one embodiment the suspension contains up to 2 wt % of microfibrillated cellulose, preferably the concentration is 0.5 to 2 wt %, or 0.6 to 1.6 wt %.

In another embodiment the microfibrillated cellulose is in the form of colloids in the suspension.

In another embodiment a water soluble cross-linker is added.

In another embodiment the cross-linker is either chitosan or hyaluronic acid.

In another embodiment the concentration of cross-linker is more than 5 wt %, or more than 10 wt %, or more than 30 wt % or more than 40 wt % but not more than 50 wt % or less than 35 wt % or less than 15 wt % based on the total mass of components.

In another embodiment the suspension is flocculated.

A fourth aspect of the present invention refers to a method of coating a surface with the nanopaper of the present invention comprising forming a solution or a suspension comprising clay and microfibrillated cellulose nanofibres
coating the surface with the solution or suspension.

A fifth aspect of the present invention refers to the use of the nanopaper as paper, filter paper, fire or heat resistant material, reinforcement compound, wall paper, cardboard, paperboard, liquid packing board, packing material, food packaging, water vapor barrier, fat barrier, liquid barrier, gas barrier, coatings, speaker membranes, battery membranes or bullet proof material.

DETAILED DESCRIPTION OF THE INVENTION

In the present application the term "clay" refers to silicates with a layered or platelet structure. The clay could be, but is not limited to, a clay from the smectite family for example montmorillonite.

In the present application the term "mixing" includes, but is not restricted to, terms such as blending, stirring, shaking and dispersing.

In the present application the term "cross-linking" refers not only to covalently linking but also to ionic or hydrogen bonding.

Polymer/clay nanocomposites with 1-10 wt % of mineral have been commercialized successfully for 30 years. However, new nanocomposites with high content of clay are still unavailable in the market even though there are a lot of research in this field, such as nacre analogues by layer-by-layer self-assembly. This is because it is very difficult to find a method to optimize or balance among the mechanical and barrier properties, fabrication time, mass production, and so on. Unlike a lot of prior art methods, the present invention does not use pulp and uses only cellulose nanofibres and clay with particles in the nanometer range. For example, JP 07-003691 describes a system that uses fibrilles, or rather fines, in the 100 μm range and clay with particles in the micrometer range. Further, previous studies have only described a low content of clay in their papers. For example Nordqvist et al. (J biobased materials and bioenergy, 2009, 3(2)) presented a MFC/MMT paper where the MMT (clay) content was only 4 wt %. The present invention, as will be shown, refers to papers where the clay content could be up to 90 wt % without being too brittle to handle. The possibility of having a higher clay content than previously been described gives the possibility to further vary the properties of the paper but also to lower the cost of such papers since the clay is usually much cheaper than the MFC.

Microfibrillated cellulose nanofibers (MFC) from wood are an interesting new material that can provide strong reinforcement in the polymer nanocomposites due to the high stiffness of the cellulose crystals and the network formation characteristics of the nanofibrils. It has a high aspect ratio and even though the individual nanofibres may form bundles they have a lateral dimension of typically 5-40 nm, or 10-30 nm. The axial modulus of the cellulose crystal is very high and has been experimentally determined to be 134 GPa. MFC can be dispersed well in the water because there are a lot of hydroxyl groups and negative charge on the surface. MFC cannot be dissolved in water or common organic solvents due to its high crystallinity (70.4%) and strong inter- and intra-molecular hydrogen bonding caused by the hydroxyl groups. As a result, compared with WSPs, the MFC would improve the solvent-resistance of the final composites. It is clear that, as a binder additive, MFC has more advantages than WSPs.

According to the present invention the strong clay/MFC nanopaper is prepared by suspension mixing and filtrating of predominantly smectite clays together with MFC (from 10 to 50 wt. %) as binder. The MFC could be derived from pulp which is exposed to an enzymatic treatment in order to obtain a pretreated pulp. This pulp could then be mechanically beaten followed preferably by homogenization. Solutions of MFC contain preferably up to 2 wt % of MFC where the nanofibres form colloids in the suspension. Higher concentrations could be used but the high viscosity can be problematic. The clay solution contains preferably up to 2 wt % of clay, for example more than 0.5 wt %, or more than 0.75 wt % or more than 1.25 wt %. The clay has a layered or a platelet structure and the particles found in the nanopaper of the present invention are in the nanometer range, i.e. up to 300 nm for example 10-200 nm, or 50-150 nm.

The nanopaper may comprise one or just a few layers of clay and MFC but can also be a multilayered structure like nacre, and both clay and MFC are more in-plane than in-space oriented. The nanopaper has good mechanical properties as well. The tensile stress of clay nanopaper with 12.5% and 50% of MFC are 32 MPa and 124 MPa, respectively. The nanopaper also has good thermal stability since it still keeps pretty high storage modulus even the temperature is up to 200° C. Besides the excellent mechanical properties, the nanopaper exhibits high oxygen gas-barrier properties.

As known in the art a suspension of MFC and Na+-MMT (sodium montmorillonite) is very stable even after 10 h. Therefore dewatering through filtration may take long time, which is an obstacle for mass production in industry. Further, there is no strong interaction between MFC and MMT, which lead to the low swelling resistance at high humidity. However there are many of hydroxyl groups and negative charges on the surface of MFC nanofibers and Na+-MMT platelets which may provide a possible chance to form hydrogen bondings or electrostatic interactions with a positively charged counter part, such as chitosan. Thus, in one embodiment, protonated chitosan can be used to modify the MFC/MMT nanopaper via ionic crosslinking by suspension blending. A small amount of positively charged chitosan may result in a good effect of flocculation or ionic cross-linking interaction on both of MFC and MMT due to the electrostatic and hydrogen-bonding interaction. So the filtrating time during processing was cut to about one-tenth of what it had been. The incorporation of a small amount of chitosan (10 wt %) still resulted in a layered biomimic structure, and increased tensile strength and oxygen barrier properties of nanopaper at very high relative humidity. The cross-linker could also be hyaluronic acid or any other water soluble polymer, such as polysaccharides, or combinations thereof which preferably contains positive charges when in an aqueous solution. The concentration of the cross-linker may be varied depending on the wanted properties, the present invention specifically refers to nanopapers with a cross-linker content of up to 50 wt %.

Additionally, the nanopaper has excellent flame retardance and good oxygen-barrier properties. To the best of our knowledge, it is the simplest method to emulate biomimic multilayered nanocomposites with high content of clay and satisfactory properties. This simple method will pave a new way to simulate nacre using water-insoluble binder, for example plant nanofibers, and facilitate mass production.

The nanopaper could further be used as a coating applied to another paper, paper board, cardboard or a packing material. The coating could be applied to the surface by various techniques including dip coating, spraying, smearing, painted on or laminated onto. The coating can be applied in several layers by repeating the coating step.

EXPERIMENTS

Example 1

MFC/Clay Nanopaper

Materials

The clay used was a sodium montmorillonite ($Na^+$-MMT) (Cloisite $Na^+$, Southern Clay Products) with a cation-exchange capacity (CEC) of 92 meq/100 g. The average size of the platelets was 110 nm as described by the manufacturer. A suspension of 1.0 wt % clay was prepared by dispersing 10 g of clay in 1 L of de-ionized water under vigorous stirring before using.

Preparation of Microfibrillated Cellulose

MFC was obtained by a combination of enzymatic and homogenization processing of softwood dissolving pulp (7% hemicellulose) provided by Domsjo Fabriker AB, Sweden. The enzyme used was Novozym 476, manufactured by Novozymes A/S, Denmark. This enzyme is an endoglucanase expected to degrade the cellulose molecules by cutting the chains in the noncrystalline regions. The enzymatic treatment was carried out as follows. The pulp was first beaten 1000 revolutions in a PFI-mill, manufactured by HAM-JERN, Hamar, Norway, to make the cellulose more easily accessible for the enzymes. This was done according to the standardized method EN 25 264-2:199413 with one modification: 40 g pulp diluted with water to a total weight of 300 g (13.3% dry content) was used. This was followed by an enzymatic treatment where 3% pulp, by weight, was dispersed in 50 mM tris/HCl buffer with pH 7 and 1.5% enzyme by weight of the pulp was added. The pulp was incubated at 50° C. for 2 h, washed with deionized water on a Büchner funnel, thereafter incubated again at 80° C. for 30 min, to stop the activity of the enzymes, and then washed again. The pulp was finally beaten in a PFI-mill with 4000 revolutions. Finally the pretreated pulp was subjected to the homogenizing action of a slit homogenizer, Laboratory Homogenizer 15M, Gaulin Corp., Everett, Mass. A 2% pulp suspension was passed 25 times through the slit. This method is based on the work by Henriksson et al. Degree of polymerization (DP) was estimated to 480 from the average intrinsic viscosity after homogenization. Finally, MFC suspension with 1.63 wt % solid content was obtained, which was kept at 4° C. Then 0.2 wt % MFC suspensions were prepared by dissolving 215 g MFC suspension in 1503 ml of de-ionized water and were vigorously stirred before using.

The Preparation of MFC/Clay Nanopaper

MFC/clay nanopapers with 12.5 wt %, 20 wt %, 33 wt % and 50 wt % MFC were prepared as follows. MFC suspensions, 1.6 wt %, containing 0.5, 0.5, 1 and 1.5 g of MFC were slowly added to 1.0 wt % clay suspensions containing 4, 2, 2 and 1.5 g of clay to obtain mixture suspensions with weight ratio of MFC to clay 1:8, 1:4, 1:2 and 1:1. The mixture suspensions were stirred for 24 h and were then further dispersed for 30 mins by ultrasonic equipment. Then the mixtures were vacuum-filtrated by Rapid Köthen using filter membrane, 0.65 μm DVPP, Millipore, USA. The filtration time ranges from 30 to 90 min depending on the thickness of the final nanopaper and the concentration of clay. After filtration, the wet films were carefully peeled off from the filtration membrane and stacked between metal grids and then everything was placed between two filter papers. Finally, clay nanopapers with thickness in the range of 60-80 μm were obtained after dried by vacuum at 93° C. for 10-15 min.

X-Ray Diffraction and Orientation (XRD)

X-ray diffraction photographs were taken by an imaging plate (IP) having a camera length of 38.3 mm. The Cu Kα radiation, generated with a Rigaku RINT-2000 at 40 kV, 35 mA, was irradiated on the specimen perpendicular or parallel to the film surface.

Scanning Electron Microscopy (SEM)

The morphology was examined with a JEOL JSM-820 Scanning Microscope. The samples were held in liquid $N_2$ and a brittle fracture was performed. A few nm thick layer of gold was sputtered onto the surface of cross-sections prior to imaging. The size of the nanofibres was determined using SEM.

Tensile Testing

The tensile tests of the films were performed with a Universal Materials Testing Machine from Instron, USA, equipped with a 100 N load cell. Specimens of 40 mm length and 60-80 μm thickness and 5 mm width were tested with strain rate of 4 mm/min. The relative humidity was kept at 50% and the temperature at 23° C. The specimens were conditioned for at least 48 hours in this environment prior to testing. The displacement was measured by Digital Speckle Photography (DSP). A pattern was prepared for the DSP by applying printer toner to the sample surface. During tensile test images of the whole specimen was taken. The frame rate was set to 5 fps. The results for each material are based on at least 6 specimens, if nothing else is mentioned.

Dynamic Mechanical Analysis

The dynamic mechanical properties of the films were measured with TA Instruments Q800 in tensile mode. The distance between the grips was 10 mm and the heating rate was 3° C./min. The specimens, with thickness varying between 60 to 80 μm and width of 5 mm, were dried in vacuum oven at 50° C. prior to the analysis.

Thermogravimetric-Differential Thermal Analysis (TG-DTA)

The thermogravimetric analysis (TGA) was conducted on a Perkin-Elmer TGA 7-thermal analyzer from 25 to 800° C. with a heating rate of 10° C./min under oxygen with flow rate 30 ml/min.

Oxygen Transmission Rates

The permeability of the material to oxygen at 23° C. was determined using a Mocon OX-TRAN TWIN equipped with a coulometric oxygen sensor. Degassed film samples with thickness of 60±20 μm were mounted in an isolated diffusion cell and were subsequently surrounded by flowing nitrogen gas to remove sorbed oxygen from the samples. The sample had a circular exposure area of $50 \times 10^{-4}$ m$^2$ achieved by covering a part of the film with a tight aluminum foil that has an adhesive on its surface. One side of the sample was initially exposed to flowing oxygen containing 1% hydrogen at atmospheric pressure. The oxygen pressure was zero on the other side. The flow rate (Q) through the sample was measured and, from the steady-state flow rate (Q∞), the oxygen permeability coefficient (P) was calculated.

Results

Recently, suspension blending and vacuum filtrating method was developed for preparation of nanocomposites. MFC and clay mixture suspension in water was prepared by magnetic stirring and ultrasonic dispersing. Then the mixture was filtrated and dried quickly by Rapid Köthen, a kind of paper-making machine. The whole fabrication time to obtain a big film ranges from 30 to 100 minutes depending on the final thickness of the films and content of clay. The clay/MFC films have excellent mechanical properties and high barrier properties.

Figure 1:
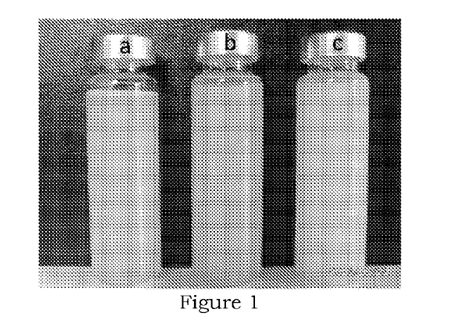
FIG. 1, photograph of 0.62 wt % MFC suspension (a), 0.62 wt % MMT suspension (b) and MFC/MMT (0.62 wt %/0.62 wt %) co-suspension in aqueous suspension after standing for 10 hour (c).

The cross-section diameter of the MFC used was between 10-20 nm and the length was more than 1 μm, which was favor to form network structure. Due to the high Young's modulus of 134 GPa, MFC have been widely used as reinforcement for preparation of polymer based composites. Additionally, MFC could be dispersed pretty well into water, as shown in FIG. 1a. The main reason is that there are many hydroxyl groups and many negative charges on the surface of the MFC, and the hydroxyl groups makes the MFC more hydrophilic and the negative charges make the microfibrils repel each other somewhat resulting in more separated nanofibres. FIG. 1b shows that the suspension of Na$^+$-MMT was very stable, probably due to the degree of exfoliation being virtually 100% in aqueous dispersion. FIG. 1c indicates that the suspension of MFC and Na$^+$-MMT was very stable even when left it standing for 10 h. Besides the good dispersion of MFC and Na+-MMT in water, negative charge on both surface make them repel each other in the aqueous suspension.

Figure 2:
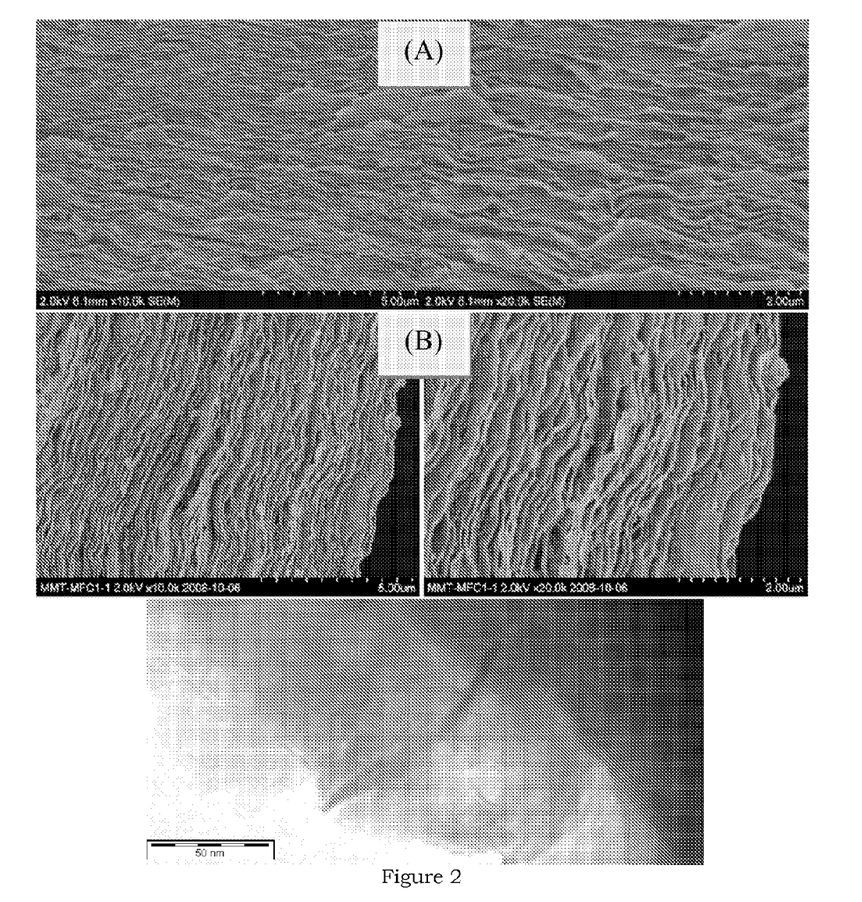
FIG. 2, SEM images of the cross section of a fracture surface of the clay films with 20 wt % (A) and 50 wt % MFC (B).

FIG. 2 shows the SEM images of cross-section structure of two films with different MFC content. The films show a layered structure which was very similar to that of nacre, and they are dense and uniform in thickness. The layers of the MFC and clay are parallel to the film surface and interpenetrate into each other, and the perpendicular sectioning slightly expanded multilayers. The layered structure observed in FIG. 2 was very interesting. In case of LBL (layer-by-layer) self-assembly, the films with were formed through alternating sequential deposition of negative and positive charged materials, and the primary driving force may be electrostatic. While for the MFC/MMT films prepared directly by mixing and filtrating, there is no driving force to facilitate the formation of multilayered structure during the preparation.

Figure 3:
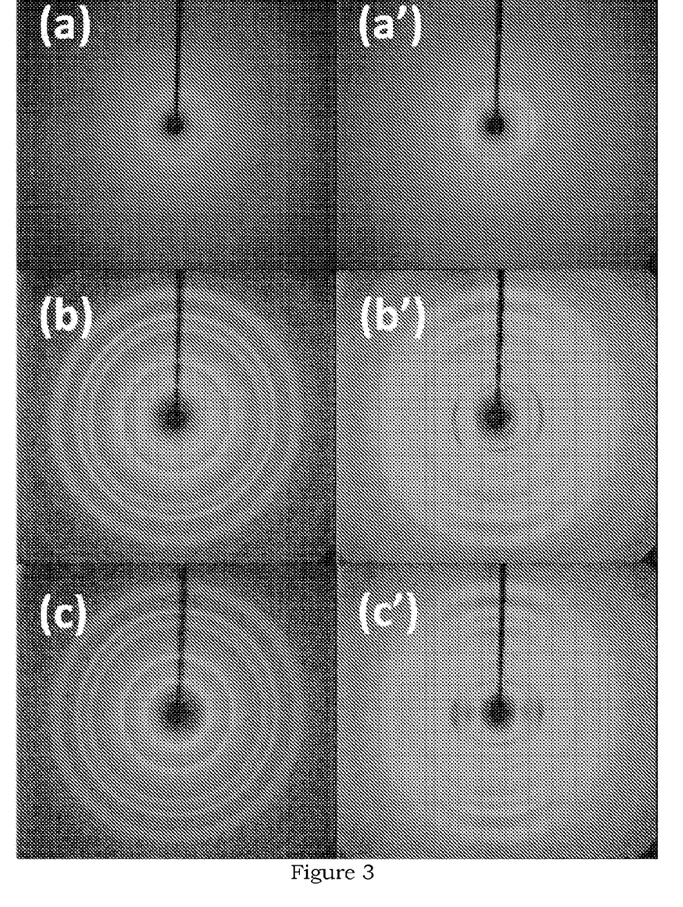
FIG. 3, two-dimensional XRD of MFC film, $Na^+$-MMT film and MMT/MFC film with 50% MFC (from up to down) perpendicular and parallel to the films surface (from left to right).

The orientation of MMT and MFC was studied by two-dimensional XRD patterns. FIG. 3 presents XRD data perpendicular and parallel to the film surface. As known, diffraction arcs are the characteristic of a preferred orientation and diffraction rings are that of a random orientation. The orientation of MFC in the plane of the film of only MFC was completely random, and the data parallel to the film surface show ordering in this plane (FIG. 3a, a'). Likewise, the orientation of MMT in films with only MMT was also parallel to the surface as show in FIG. 3b, b'. Furthermore, for the MMT/MFC film with 50 wt % MFC, the orientation of MMT and MFC was in a similar way random-in-the-plane, as shown in FIG. 3c, c'. As mentioned before, both of MMT and MFC are rigid materials and have high aspect ratio, which lead to anisotropy. Additionally, both of them are well dispersed in the aqueous suspension as mentioned above. So they are easy to orientate in the film during the filtration and drying. This could be a reason why the MFC/clay films formed layer-by-layer structure.

Figure 4:
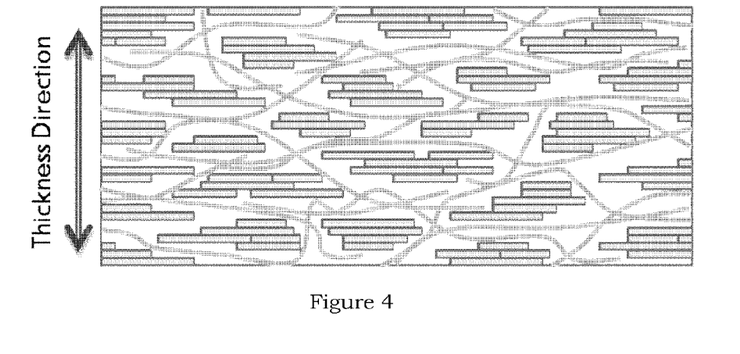
FIG. 4, schematic representation of the internal architecture of the nanopaper.

Based on the above analysis, the structure of the clay/polymer film can be represented by the schematic in FIG. 4. The brick-and-mortar-like structure made by layer-by-layer self-assembly method has the structure with many alternating layers, in which one layer is clay and one layer is polymer. However, in contrast to the brick-and-mortar-like structure model, for the clay/MFC film, MFC entangles with each other and forms a kind of network structure, and the clay platelets act as fillers in the MFC matrix. Therefore the clay/MFC films are called clay nanopaper.

Figure 5:
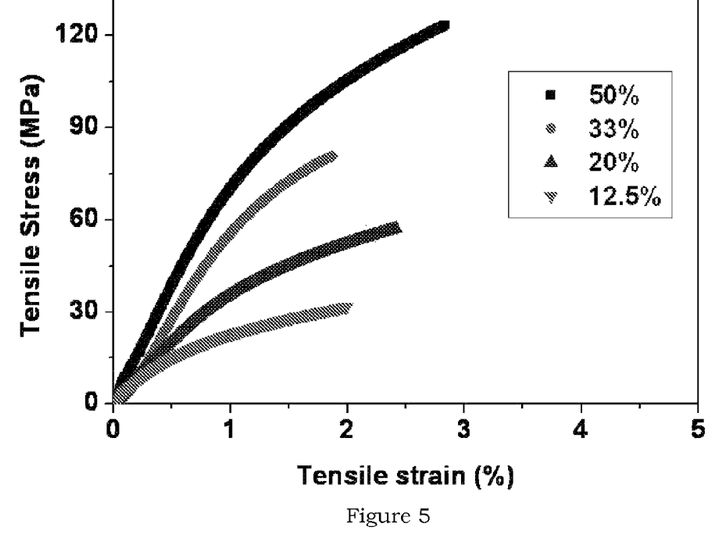
FIG. 5, stress-strain curves for nanopaper with different content of MFC.

FIG. 5 shows the stress-strain curves for nanopapers with different content of MFC. From the figure it is seen that the tensile stress and tensile strain increased with increasing MFC content. When the MFC content is 12.5%, the tensile stress of the nanopaper is 30 MPa. When further increasing the MFC content to 50%, the tensile stress of nanopaper was increased to more than 124 MPa. The modulus of nanopaper with 33 wt % of MFC is up to 6.7 GPa. All of this data show that the clay/MFC nanopapers with low content of MFC have good mechanical properties. As mentioned above, one reason is that both the MMT and the nanofibers are oriented in the plane and there is a strong interaction between MMT and MFC due to the many hydroxyl groups on the MFC surface. Another reason could be that MFC still have the capability to remain good network structure in the matrix of MMT even at very low content because of the entanglement as illustrated in FIG. 4.

Figure 6:
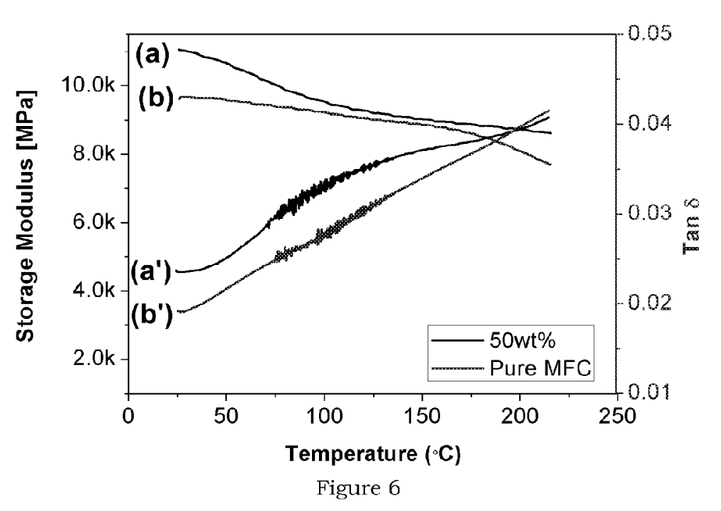
FIG. 6, storage modulus (a, b) and Tan δ(a', b') as a function of temperature for composites with 50% MFC (a, a') and pure MFC (b, b').

From the DMA given in FIG. 6, it can be seen that the nanopaper with 50% MFC resulted in very high storage modulus of up to 11 GPa. The storage modulus was still more than 8 GPa even after heated to 200° C. It means that the clay/MFC nanopaper has higher heat resistance than normal polymers or their nanocomposites. One theory is that the high crystallinity of MMT and MFC attributed to the high storage modulus. Compared with pure MFC, the storage modulus of nanopaper was higher. The reason for the high damping of the film might be related to strong interaction between MMT and MFC.

Figure 7:
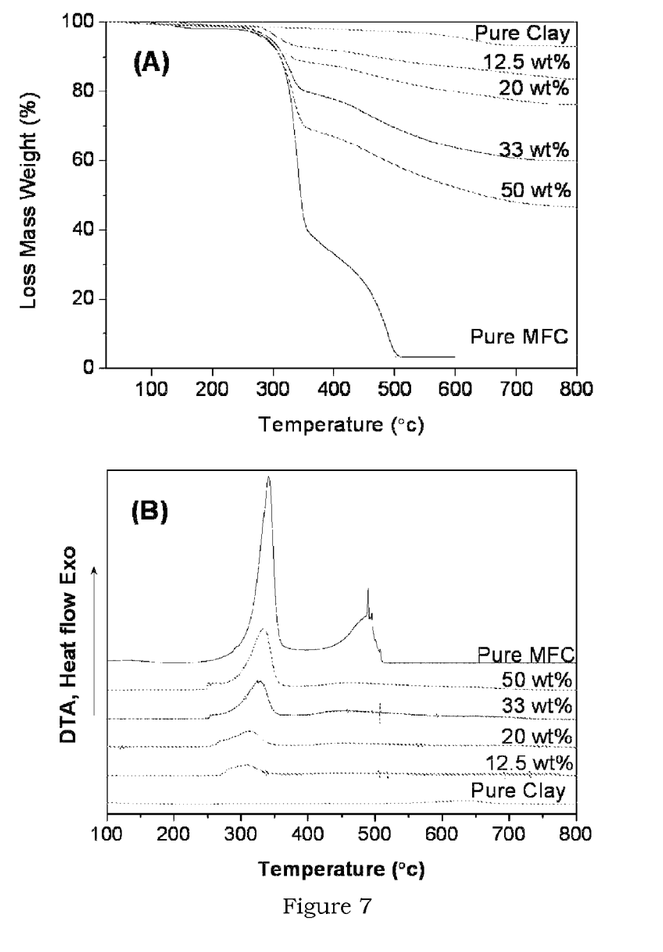
FIG. 7, results of TGA (A) and DTA (B) for nanopapers with different content of MFC under the $O_2$ environment.
Figure 8:
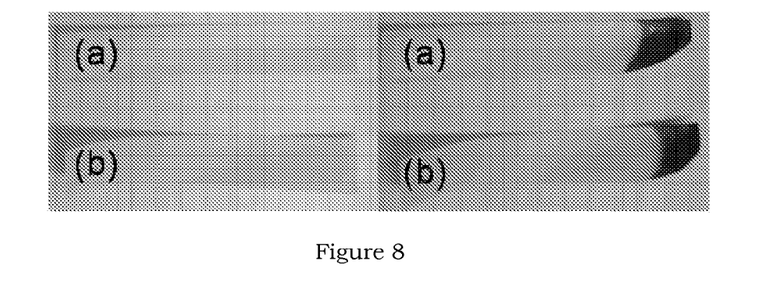
FIG. 8, photo of nanopaper with 50 wt % MFC (a) and 12.5 wt % MFC (b) before (left) and after (right) burning in the air. The sample size is 60 mm×10 mm×40 μm.

The TG-DTA results of the nanopaper with different content of MFC were shown in FIG. 7. The decomposition rate increased with increasing MFC content. From the viewpoint of heat durability, the MFC content should be reduced as much as possible. The flame retardant properties of the nanopaper were also measured. FIG. 8 shows the photographs of nanopapers with 12.5 wt % and 50 wt % MFC after burning. The spread of fire was clearly prevented and the nanopaper still kept good shape and strength, which is very important for fire-resistant material. This is a result of the presence of the high content of clay.

Oxygen gas-barrier properties of nanopaper were measured under dry and 50% relative humidity conditions. The oxygen permeability (OP) of nanopaper containing 50% MFC at dry condition was less than 0.01 cm$^3$ 25 µm m$^{-2}$ day$^{-1}$ atm$^{-1}$ (1 atm=101325 Pa), which was better than that of synthetic polymer films such as EVOH, PVC and PVOH that have high oxygen barrier functionality. It is believed without being bound by any theory that the layered structure of nanopaper and the relative orientation of MMT in plane increase the path of small gas molecules diffusing according to the tortuous-path model. Additionally, both of MMT and MFC have high crystallinity which would decrease the transmission rates of the gas molecules. The OP of nanopaper containing 50% MFC at 50% RH was 1.9±0.1 cm$^3$ 25 µm m$^{-2}$ day$^{-1}$ atm$^{-1}$. One reason could be that both MFC and clay were swollen by water due to their hydrophilicity.

Example 2

MFC/Clay-Chitosan Nanopaper

Materials

The clay was a sodium montmorillonite (Cloisite Na$^+$, Southern Clay Products) with a cation-exchange capacity (CEC) of 92 meq/100 g. The average size of the platelets was 110 nm as described by the manufacturer. MMT suspension (1.0 wt %) was prepared by dispersing 10 g of MMT in 1 L of de-ionized water under vigorous stirring before using.

MFC was prepared based on the work by Henriksson et al. Degree of polymerization (DP) was estimated to 480 from the average intrinsic viscosity after homogenization. Finally, MFC suspension with 1.63 wt % solid content was obtained, which was kept at 4° C.

Chitosan of high molecular weight (Mw=342500 g mol$^{-1}$) containing an average number of glucosamine units of 2130 (glucosamine M$_w$=161 g mol$^{-1}$) was supplied by Aldrich. Chitosan solutions, 0.5% (w/v), were prepared by the addition of corresponding amounts of the polysaccharide to 1% (v/v) acetic acid (Merck), and after the resulting solution was stirred for about 2 h, the pH of the polysaccharide solution was adjusted to 4.9 with NaOH before mixing it with the MMT or MFC/MMT suspension.

The Preparation of Nanocomposites

CS modified MFC/MMT nanopaper: First, MFC/MMT suspension (0.62 wt %/0.62 wt %) with weight ratio of 1:1 was prepared. 613 g MFC suspension (solid content 1.63 wt %) was added to 1000 g MMT suspension (solid content 1.0 wt %), and stirred for at least 4 h. The suspension was stirred vigorously before using. Chitosan solutions containing 0.2 g, 0.4 g, 1.0 g of biopolymer were slowly added to 163 g MFC/MMT suspension, at 80° C., to obtain a nanopaper with initial chitosan-(MFC/MMT) ratios of 0.1:1, 0.2:1, 0.5:1, coded as CS10-NP, CS20-NP, CS50-NP, respectively. The mixture suspension was stirred for 2 h and washed with de-ionized water until free from acetate. Then the mixtures were vacuum-filtrated by Rapid Köthen using filter membrane, 0.65 µm DVPP, Millipore, USA. The filtration time was only 2-3 mins. After filtration, the wet films were carefully peeled off from the filtration membrane and stacked between metal grids and then everything was placed between two filter papers. Finally, clay nanopapers with thickness in the range of 90-100 µm were obtained after dried by vacuum at 93° C. for 10-15 min.

CS/MFC nanopaper: chitosan solutions containing 0.1 g, 0.2 g, 0.3 g of biopolymer were slowly added to 500 g MFC suspension (solid content 0.2 wt %), at 80° C., to obtain nanocomposites with initial chitosan-MFC ratios of 0.1:1, 0.2:1, 0.3:1, coded as CS10-MFC, CS20-MFC, CS30-MFC. The mixture suspension was stirred for 2 h and washed with de-ionized water until free from acetate. CS-MFC nanopaper was obtained according to the method of CS-NP.

CS/MMT nanocomposites: chitosan solutions containing 0.2 g, 0.4 g, 1.0 g of biopolymer were slowly added to 100 g MMT suspension, at 80° C., to obtain nanocomposites with initial chitosan-MMT ratios of 0.2:1, 0.4:1, 1.0:1, coded as CS20-MMT, CS40-MMT, CS100-MMT, respectively. The mixtures suspension was stirred for 2 h and washed with de-ionized water until free from acetate. Finally, the nanocomposites were dried at 50° C. and ground to powder.

Characterization

Wide angle XRD patterns of the obtained films were recorded by a Siemens D5000 X-ray diffractometer at room temperature. The CuKR radiation source was operated at 40 kV and 40 mA. Patterns were recorded by monitoring diffractions from 1.5° to 30°. The scan speed was 2°/min.

Fourier transform infrared (FTIR) spectra (transmission) were measured on a Perkin-Elmer FTIR spectrophotometer 2000 in the range of 4000-400 cm$^{-1}$ at a resolution of 4 cm$^{-1}$.

The morphology was examined with a JEOL JSM-820 Scanning Microscope. The samples were held in liquid N$_2$ and a brittle fracture was performed. A few nanometer thick layer of gold was sputtered onto the surface of cross-sections prior to imaging.

The tensile tests of the films were performed with a Universal Materials Testing Machine from Instron, USA, equipped with a 100 N load cell. Specimens of 40 mm length and 60-80 µm thickness and 5 mm width were tested with strain rate of 4 mm/min. The relative humidity was kept at 50% and the temperature at 23° C. The specimens were conditioned for at least 48 hours in this environment prior to testing. The displacement was measured by Digital Speckle Photography (DSP). A pattern was prepared for the DSP by applying printer toner to the sample surface. During tensile test images of the whole specimen was taken. The frame rate was set to 5 fps. The results for each material are based on at least 6 specimens, if nothing else is mentioned.

The thermogravimetric analysis (TGA) was conducted on a Perkin-Elmer TGA 7-thermal analyzer from 25 to 800° C. with a heating rate of 10° C./min under oxygen with flow rate 50 ml/min.

The permeability of the material to oxygen at 23° C. was determined using a Mocon OX-TRAN TWIN equipped with a coulometric oxygen sensor. Degassed film samples with thickness of 95±5 µm were mounted in an isolated diffusion cell and were subsequently surrounded by flowing nitrogen gas to remove sorbed oxygen from the samples. The sample had a circular exposure area of 100×10$^{-4}$ m$^2$ achieved by covering a part of the film with a tight aluminum foil that has an adhesive on its surface. One side of the sample was initially exposed to flowing oxygen containing 1% hydrogen at atmospheric pressure. The oxygen pressure was zero on the other side. The flow rate (Q) through the sample was measured and, from the steady-state flow rate (Q∞), the oxygen permeability coefficient (P) was calculated.

The kinetics of water sorption of films was measured using a Dynamic Vapor Sorption apparatus from Surface Measurement System. The sample was dried at RH 0%, 30° C. until a constant weight was attained. Then the test began at RH 50%, 30° C. until a constant weight was attained.

Results

Figure 9:
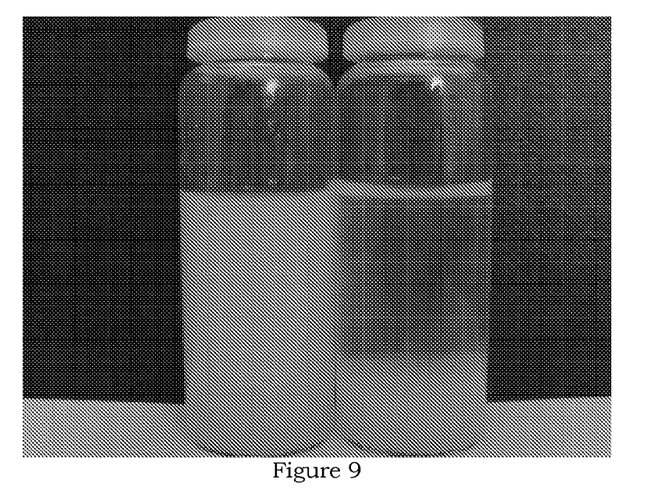
FIG. 9, photo of the co-suspension of MFC/MMT (weight ratio=1/1) before and after adding 10 wt % positively charged chitosan.

FIG. 9 shows the photo of the suspension of MFC/MMT (weight ratio=1/1) before and after the addition of 10 wt % positively charged chitosan. The suspension of MFC/MMT suspension was very homogeneous and stable. This could be a result of the many hydroxyl groups and negative charges on the surface of the MFC and MMT. Furthermore, the hydroxyl groups make the MFC and MMT more hydrophilic and the negative charges make the microfibrils and MMT platelets disperse and repel each other resulting in a uniform dispersion. When 10 wt % positively charged chitosan was added dropwise into the MFC/MMT suspension at 80° C. under magnetic stirring, an upper part of the suspension became totally transparent when left standing as show in FIG. 9. This may be an indication that the all of the MFC/MMT are flocculated. This could be a result of the electrostatic interaction between chitosan and MFC/MMT, which was proved later and discussed below. Hence positively charged chitosan acts as flocculants in a suspension of negatively charged MFC and MMT.

Figure 10:
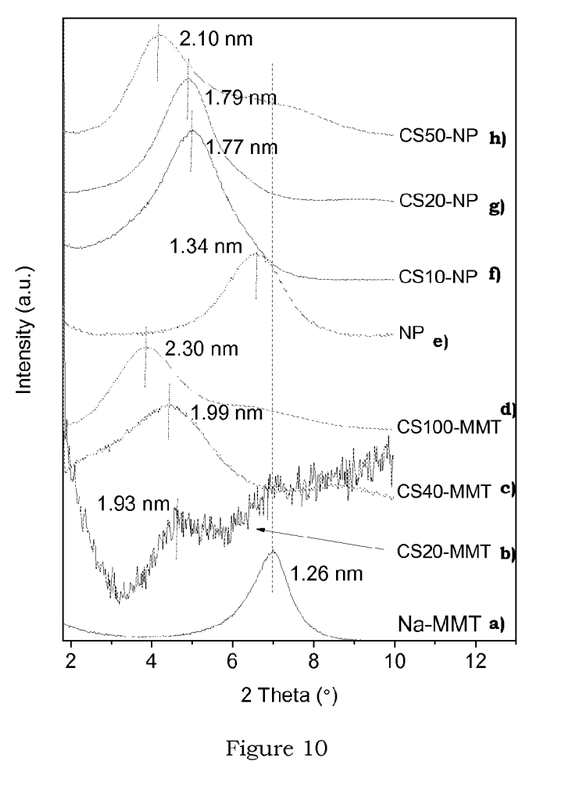
FIG. 10, XRD patterns of CS-MMT nanocomposites and CS-NP with different content of chitosan.

In order to study the effect of positively charged chitosan on the MFC/MMT nanopaper, chitosan/MMT nanocomposites (CS-MMT) with different content of chitosan were prepared by the same method. XRD patterns of CS-MMT with different content of chitosan are shown in FIG. 10a-d. XRD peaks of all silicates shift to lower angle with increasing chitosan content. The $d_{001}$ peak of MMT shifts from 7.0° to 3.8°, corresponding to a $d_{001}$ value of 2.3 nm. The increase of the interlayer distance indicates that positively charged chitosan intercalated into the interlayer of MMT and formed an intercalated structure, in contrast to analogous polysaccharides with coiled or helicoidal structures that are only adsorbed in the external surface of clays. Furthermore, the XRD of MFC/MMT nanopapers with different content of chitosan were studied as show in FIG. 10e-h. The XRD peaks for all the silicates shifted towards lower angles when increasing the chitosan content, the same phenomenon was also seen for chitosan/MMT nanocomposites. This indicates that positively charged chitosan intercalated successfully into the interlayer of MMT and formed an intercalated structure. It also shows that MFC have no clear influence on the interaction between chitosan and the clay, even if MFC must absorb some parts of positively charged chitosan.

Figure 11:
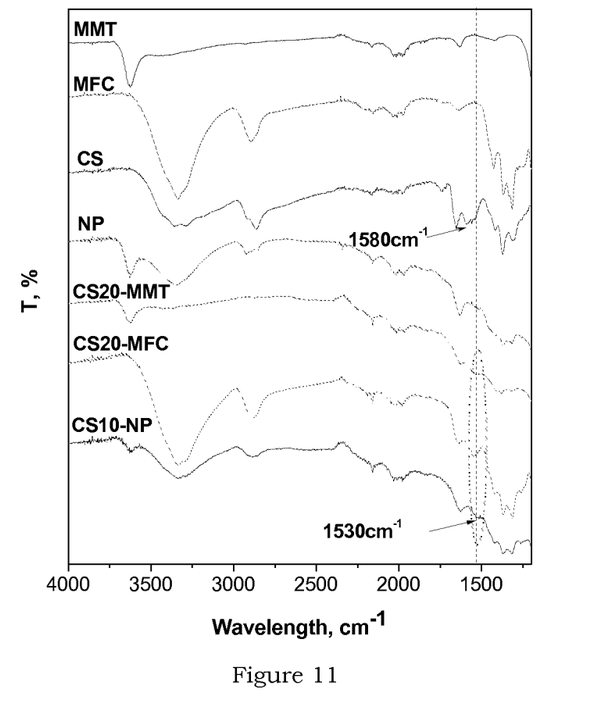
FIG. 11, IR spectra of MMT, CS, MFC, NP, CS20-MMT, CS20-MFC and CS10-NP.

FTIR spectroscopy was used to characterize the interaction between them. FIG. 11 shows the IR spectra of Na-MMT, chitosan, MFC, nanopaper (NP, 50/50 MMT-MFC), CS-MMT, CS-MFC and CS-nanopaper, in the 4000-1200 $cm^{-1}$ wavenumber range. The frequency of vibrational bands at 1580 $cm^{-1}$ in chitosan, which corresponds to the deformation vibration ($\delta NH_3$) of the protonated amine group, shifted towards lower frequency values to 1530 $cm^{-1}$ for CS20-MMT. This could be related to the electrostatic interaction between protonated amine groups and the negatively charged sites in the clay.

For CS20-MFC, the frequency of vibrational bands ($\delta NH_3$) shifted to 1530 $cm^{-1}$, which indicates that there was also electrostatic interaction between protonated amine groups and negatively charged sites in the MFC nanofibers. Actually, it has previously been confirmed that chitosan can be absorbed on the cellulose surface via the electrostatic adsorption and nonelectrostatic adsorption, such as hydrogen bonding. There are two kinds of adsorption mechanism. One is electrostatic adsorption mechanism due to the interaction between the positively charged chitosan and negatively charged cellulose fibers. The other is nonelectrostaitc adsorption mechanism including the hydrogen bonding between chitosan and cellulose, due to the repeating backbone having the same structure.

Figure 12:
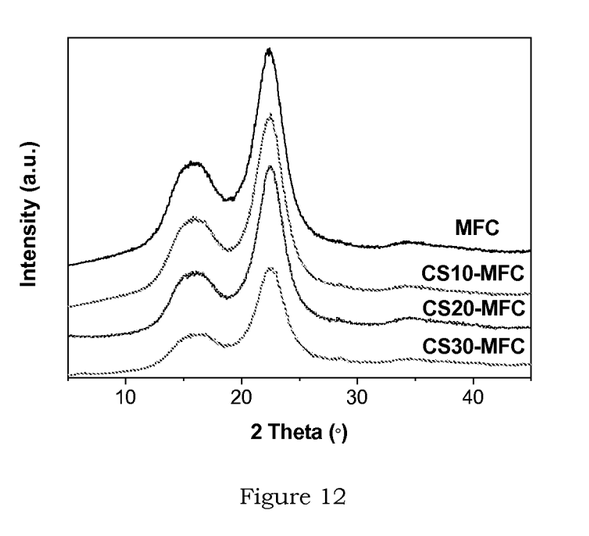
FIG. 12, wide-angle X-ray diffraction curves of MFC and CS-MFC with different content of chitosan.

Further, the effect of chitosan on the crystalline type of MFC was studied. The wide-angle X-ray diffraction curves of MFC and CS-MFC are shown in FIG. 12. As known in the art, the crystalline scatter of the 002 reflection is at 2θ of 22.5° for cellulose I or 101 reflection at 2θ of 19.8° for cellulose II (crystalline height) with the height of the 'amorphous reflection' at 2θ of 18° for cellulose I or 16° for cellulose II (amorphous height), respectively. What was observed was that MFC nanofibers belong to cellulose I. Further, the incorporation of chitosan did not change the crystalline type during the preparation. This indicates that chitosan was just absorbed on the surface of MFC nanofibers.

Similarly, for CS 10-NP the frequency of vibrational bands ($\delta NH_3$) shifted to 1530 $cm^{-1}$. As mentioned above, both of sodium MMT and MFC could absorb the chitosan in the aqueous suspension by electrostatic or hydrogen-bonding interaction, which explain the MMT and MFC are both flocculated with incorporation of chitosan. It also suggests that the MMT and MFC were both cross-linked physically via the ionic interaction provided by positively charged chitosan. The MMT platelets were adsorbed on the surface of MFC nanofibers and chitosan act as bridge or binder between them.

Figure 13:
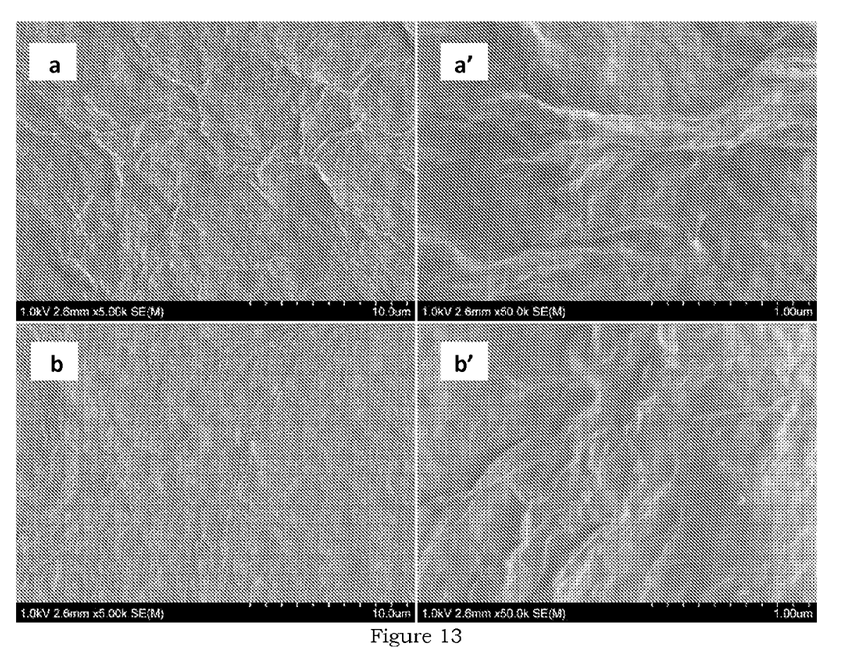
FIG. 13, SEM images of the surface morphology of NP (a, a') and CS-NP (b, b').

The surface morphology of NP (50/50 MMT-MFC) and CS-NP was observed by SEM. As show in FIG. 13A, there are some big fibers on the surface of the film. The diameter of the MFC nanofibers of the present invention is 20-40 nm. So it indicates that a small amount of MFC nanofibers re-aggregated together during the filtrating and drying process due to the strong hydrogen-bonding interaction between the MFC nanofibers. However, the surface of CS-NP in FIG. 13B was very homogenous compared with that of NP. No aggregation phenomenon of MFC nanofibers was observed. As mentioned before, the MMT platelets and MFC nanofibers were cross-linked with incorporation of chitosan in the aqueous suspension. So the ionic interaction between MMT and MFC was stable and the re-aggregation of MFC during the filtrating and drying process was avoided.

Figure 14:
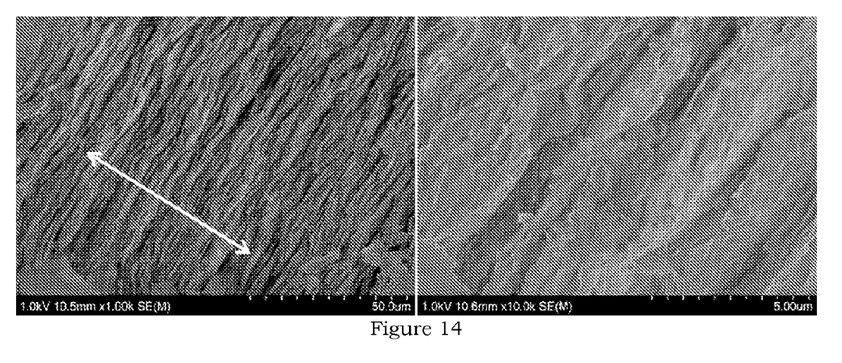
FIG. 14, SEM images of the cross section of a fracture surface of CS 10-NP.

FIG. 14 shows the SEM images of cross-section structure of CS 10-NP. The arrow indicates the thickness direction of film. The films show a layered structure parallel to the surface. The films are further dense and uniform in thickness.

Figure 15:
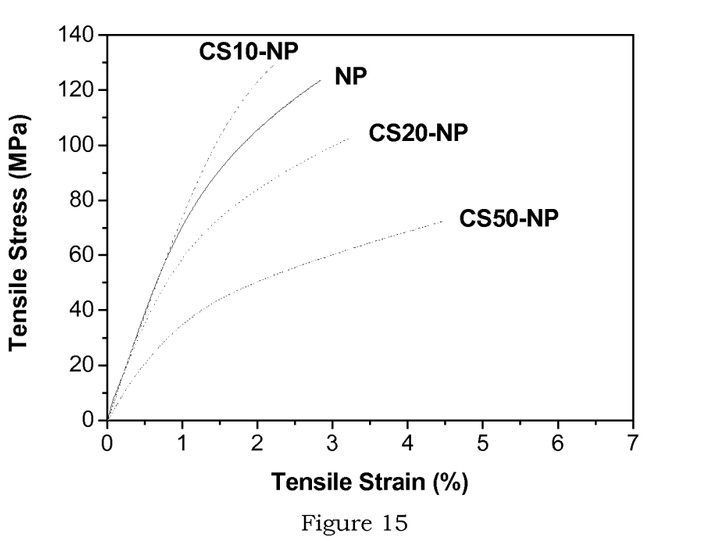
FIG. 15, stress-strain curves for CS-NP with different content of chitosan.

FIG. 15 shows the stress-strain curves for nanopapers with different content of chitosan. As stated earlier, the tensile stress of nanopaper was about 124 MPa, which is almost similar with that of mineralized tissues from nature, such as nacre and bone, as well as artificial materials, such as clay/polyelectrolytes and clay/polyvinyl alcohol multilayer nanocomposites prepared by layer-by-layer self-assembly. The properites of the nanopaper are related to the orientation of MMT platelets and MFC nanofibers in the plane, the strong hydrogen-bonding interaction and good network structure of MFC. From FIG. 15 it can be seen that the tensile stress of CS 10-NP increased slightly to 134 MPa with incorporation of 10 wt % chitosan and even slightly stiffer than the NP, which indicates that the interaction between MMT and MFC was improved due to the ionic cross-linking provided by cationic chitosan.

Figure 16:
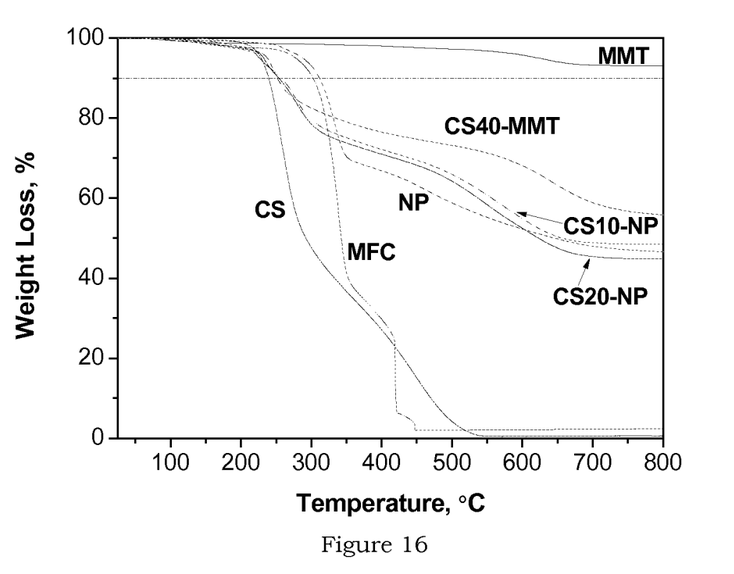
FIG. 16, TG curves of MMT, MFC, CS, and the nanocomposites.

TG curves of MMT, MFC, CS, and the nanocomposites are shown in FIG. 16. These curves are similar to each other, in which the two-temperature stages of maximum weight-loss rate can be observed. For nanopaper the degradation rate was slow downed comparing with that of pure MFC. One reason could be that clay platelets as a mass transport barrier hinder oxygen from entering and decomposition products to diffuse out. However, $T_{onset}$ (the temperature at onset decomposition when the weight loss was 10% in total of weight) of CS 10-NP and CS20-NP decreased 50° C. compared with that of NP as show in table 1. The main reason was related to the degradation behavior of chitosan. From the table 1, it can be seen that the $T_{onset}$ of CS was 239° C., which may influence the degradation of nanopaper. Anyway, the clay platelets with high aspect ratio strongly hinder the volatility of the decomposed products from pyrolysis and limit the continuous decomposition of CS as show in CS40-MMT curve.

TABLE 1

Temperature at onset of decomposition (10% weight loss) in $O_2$ flow.

|  | CS | MFC | CS40-MMT | NP | CS10-NP | CS20-NP |
|---|---|---|---|---|---|---|
| Onset of Degradation (10% Weight Loss) | 239° C. | 302° C. | 251° C. | 311° C. | 258° C. | 253° C. |

Oxygen gas-barrier properties of MFC, NP and CS 10-NP were measured under 0%, 50% and 95% relative humidity (RH) conditions, respectively. For all of them, the oxygen transmission rate (OTR) at 0% RH was below the detection limit, which was even better than normal packaging polymer such as polyvinyl alcohol. It was believed that MFC with 75% crystallinity and MMT with special layered structure would decrease the transmission rates of the gas molecules because oxygen gas molecules cannot pass through the crystalline region. The OTR of MFC and NP at 50% RH was 1.9 and 1.8 $cm^3$ 25 $\mu m^{-2} day^{-1} atm^{-1}$, respectively. This could be a result of that both of MFC and clay were swollen by water due to much hydroxyl group on their surface and the amorphous region of MFC. When 10% chitosan was added, the OTR of nanopaper decreased slightly. When the RH was increased to 95%, the OTR of MFC increased 375×. It indicates that the amorphous region of MFC was fully swollen by water due to its hydrophilicity so the OTR increased dramatically. The OTR of NP was lower than that of MFC because the layered structure of nanopaper and the relative orientation of MMT in plane increase the path of small gas molecules diffusing according to the tortuous-path model. The OTR of CS 10-NP decreased further with incorporation of 10% chitosan. Probably due to the ionic interaction between MFC nanofiber and MMT platelets provided by chitosan improved the swelling resistance of MFC nanofibers.

TABLE 2

Oxygen Transmission Rate (OTR) of MFC, NP and CS10-NP under 0%, 50% and 95% relative humidity (RH) and 100% oxygen conditions

|  | OTR at 0% RH ($cm^3$ 25 $\mu m\, m^{-2}$ $day^{-1} atm^{-1}$) | OTR at 50% RH ($cm^3$ 25 $\mu m\, m^{-2}$ $day^{-1} atm^{-1}$) | OTR at 95% RH ($cm^3$ 25 $\mu m\, m^{-2}$ $day^{-1} atm^{-1}$) |
|---|---|---|---|
| MFC | N/A | 1.9 | 712 |
| NP | N/A | 1.8 | 138 |
| CS10-NP | N/A | 1.0 | 98 |

N/A - OTR at 0% RH 100% $O_2$ for these materials was below detection limit.

Figure 17:
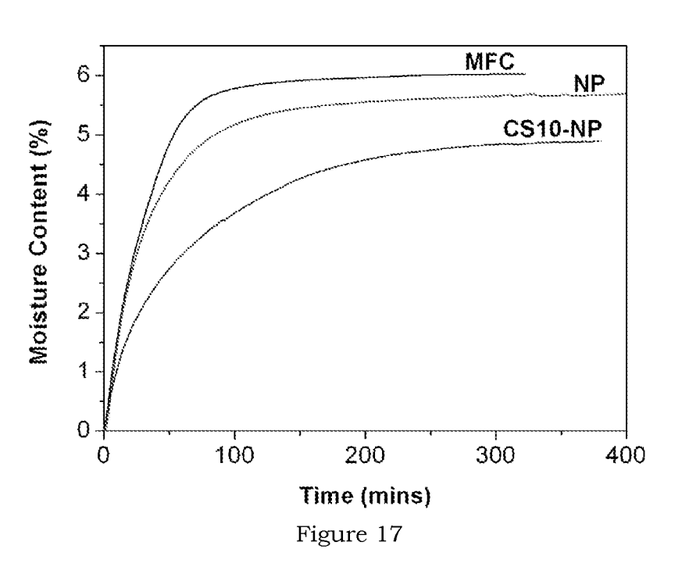
FIG. 17, DVS moisture content vs. measure time curves of MFC, NP and CS 10-NP at 50% relative humidity and 30° C.

In order to prove the swelling resistance effects of chitosan, the kinetics of water sorption of MFC, NP and CS10-NP were performed using a Dynamics Vapor Sorption (DVS) from Surface Measurement Systems. FIG. 17 shows the curves of moisture content vs. measure time at the conditions of 50% relative humidity and 30° C. The moisture uptake rate of NP was lower but not so much compared with that of MFC even if MMT platelets increase the path of small gas molecules diffusing.

The invention claimed is:

1. A nanopaper comprising clay and microfibrillated cellulose nanofibres wherein the MFC nanofibres and the layered clay are orientated substantially parallel to the paper surface, wherein the clay is a silicate with a layered or platelet structure, wherein the nanopaper further comprises a water soluble cross-linker that is chitosan.

2. The nanopaper according to claim 1 wherein the clay comprises particles in the nanometer range.

3. The nanopaper according to claim 1 wherein the length of the microfibrillated cellulose nanofibres is in the range of 5-20 μm.

4. The nanopaper according to claim 1 wherein the lateral dimension of the nanofibres is in the range of 10-30 nm.

5. The nanopaper according to claim 1 wherein the amount of microfibrillated cellulose is more than 10 wt % and less than 50 wt %.

6. The nanopaper according to claim 1 wherein the amount of clay is more than 10 wt % and not more than 90 wt %.

7. The nanopaper according to claim 1 wherein the cross-linker is positively charged when in an aqueous solution.

8. The nanopaper according to claim 1 wherein the amount of cross-linker is more than 5 wt % and not more than 50 wt % based on the total weight of the nanopaper.

9. The nanopaper according to claim 1 wherein the tensile stress of the nanopaper is at least 30 MPa for samples of 40 mm in length, 60-80 μm thick and 5 mm wide; using 100N load cell and at a frame rate of 5 fbs; and wherein the tests were conducted at a humidity of 50% and at 23° C.

10. The nanopaper according to claim 1 wherein the paper consists of the microfibrillated cellulose, clay and water soluble cross-linker.

11. A coating comprising the nanopaper of claim 1.

12. The coating according to claim 11 wherein the nanopaper comprises multiple layers of clay and nanofibres.

13. A method for preparing the nanopaper according to claim 1, the method comprising:
preparing a suspension of clay and microfibrillated cellulose nanofibres;
mixing said suspension;
filtrating said suspension;
obtaining or forming a film of said filtrated suspension; and
drying of said film.

14. The method according to claim 13 wherein the suspension contains up to 2 wt % of microfibrillated cellulose.

15. The method according to claim 13 wherein the microfibrillated cellulose is in the form of colloids in the suspension.

16. The method according to claim 13 wherein microfibrillated cellulose nanofibres are derived from pulp exposed to an enzymatic treatment in order to obtain a pretreated pulp.

17. The method according to claim 16 wherein the pretreated pulp is mechanically beaten.

18. The method according to claim 17 wherein the mechanically beaten pulp is exposed to homogenization.

19. The method according to claim 13 wherein a water soluable cross-linker that is chitosan is added.

20. The method according to claim 19 wherein the concentration of cross-linker is more than 5 wt % and not more than 50 wt % based on the total mass of components.

21. The method according to claim 13 wherein the suspension is flocculated.

22. A method of coating a surface with the nanopaper of claim 1 comprising:
   forming a solution or a suspension comprising clay and microfibrillated cellulose nanofibres;
   coating the surface with the solution or suspension to form the nanopaper of claim 1.

23. The method of claim 22 wherein the coating is done by dipping, spraying or smearing.

24. The method of claim 22 wherein the coating step is repeated.

25. The method of claim 22 wherein the solution or suspension further comprises chitosan.

26. The nanopaper of claim 1, wherein the nanopaer is used as paper, filter paper, fire or heat resistant material, reinforcement compound, wall paper, cardboard, paperboard, liquid packing board, packing material, food packaging, water vapor barrier, fat barrier, liquid barrier, gas barrier, coatings, speaker membranes, battery membranes or bullet proof material.

27. The method according to claim 13 wherein the suspension contains 0.5 to 2 wt % of microfibrillated cellulose.

28. The method according to claim 13 wherein the suspension contains 0.6 to 1.6 wt % of microfibrillated cellulose.

* * * * *